2,663,075

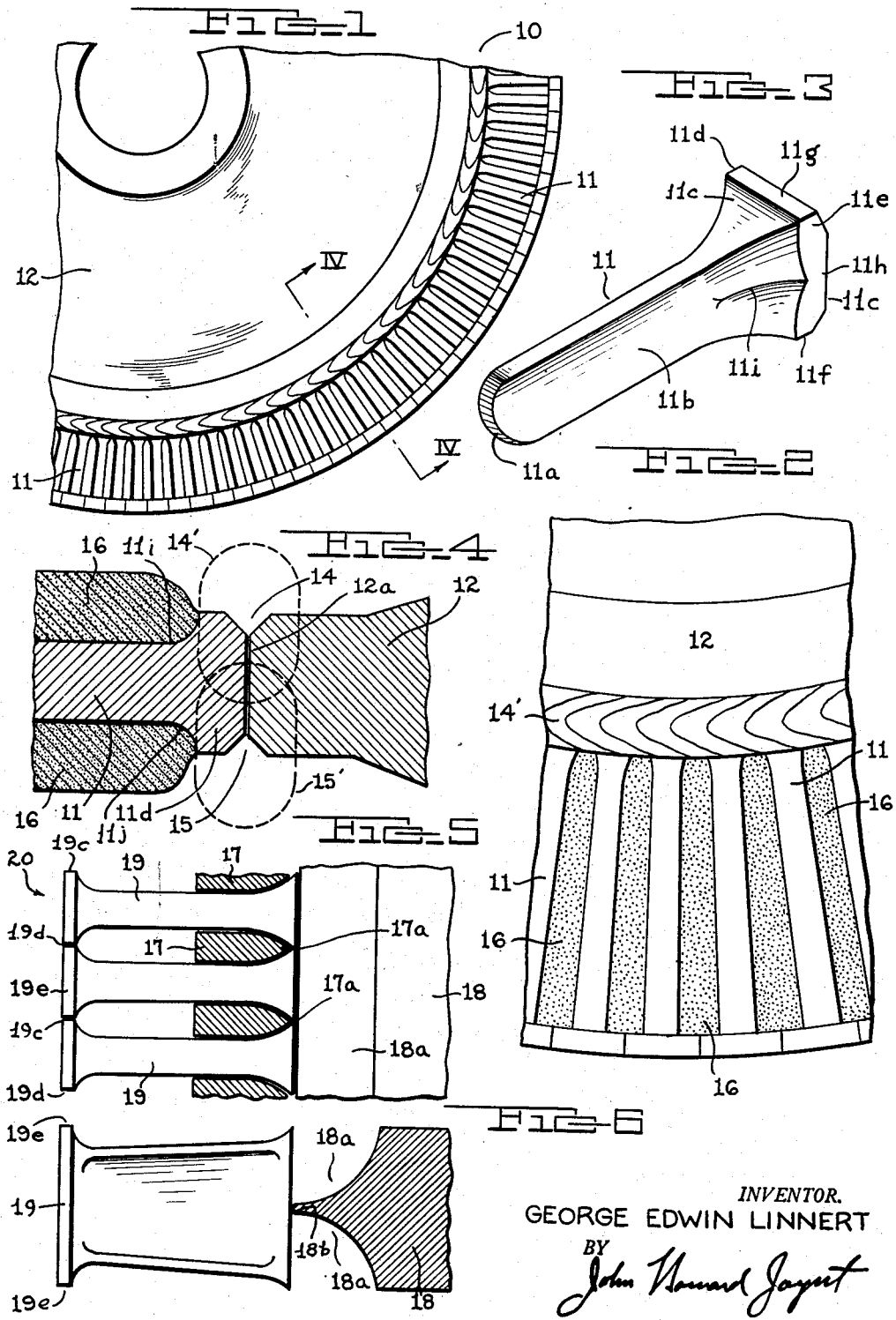
Dec. 22, 1953 — G. E. LINNERT — 2,663,075
METHOD OF WELDING TURBINE ROTORS
Filed Jan. 14, 1948
INVENTOR.
GEORGE EDWIN LINNERT
BY
HIS ATTORNEY Patented Dec. 22, 1953

UNITED STATES PATENT OFFICE 2,663,075

METHOD OF WELDING TURBINE ROTORS

George Edwin Linnert, Baltimore, Md., assignor to Armco Steel Corporation, a corporation of Ohio Application January 14, 1948, Serial No. 2,216

3 Claims. (Cl. 29—360)

This invention relates to turbines, and more especially to turbine rotors and a method for welding the blades thereof.

An object of my invention is the provision of a simple, effective and thoroughly practical method for providing welds between the blades and adjacent structure of turbine rotors, which method assures the achievement of strong, durable and reliable welds and added lasting properties of the rotor.

A further object of the invention is that of providing turbine rotors, as for example of the high temperature gas or steam turbine variety or for turbo-superchargers or jet engines, in which welded rotor blades give highly satisfactory performance from the standpoint of safety factor and freedom from mechanical failure at the zone of welding.

Other objects of my invention in part will be obvious and in part pointed out hereinafter.

The invention accordingly consists in the combination of elements, composition of materials, and features of construction, and in the several steps, and the relation of each of the same to one or more of the others as described herein, the scope of the application of which is indicated in the following claims.

In the accompanying drawing:

Figure 1 is a side elevation of a turbine rotor produced in accordance with my invention;

Figure 2 is an enlarged detailed view of a portion of the rotor represented in Figure 1;

Figure 3 is a broken away perspective view of a blade of the rotor;

Figure 4 is a transverse section taken along the line IV—IV in Figure 1 before the welding operation; and Figures 5 and 6, respectively, are side and transverse fragmentary views of a modified turbine rotor which I provide.

As conducive to a clearer understanding of certain features of my invention, it may be noted at this point that modern day turbines frequently are subjected to high speeds and to temperature variations, all of which encourage failure of the rotor and the rotor blades. The blades after being assembled by welding in place on the wheel or hub of the rotor have been known to break away from their mountings while loaded and stressed by the impelling fluid and under the added effect of centrifugal force developed at the high operating speeds. This failure, while of course sometimes being attributable to the quality of steel or other high temperature alloy metal employed in the blade structure, too often is traceable to the weld, even where the welding properties of the particular metal would suggest no failure.

In many of the welded rotors heretofore known, the adjacent faces of the blades form a sharp notch or incipient crack. As the weld metal cools following deposition, a tiny crack frequently forms which subsequently progresses into the rim of the wheel as the weld metal shrinks during service under fluctuating temperatures. Further, where stresses are engendered after the rotor is put into service, often at exceedingly high speeds and at high temperatures, the crack continues to propagate and is often the cause of rotor failure with extensive damage or at least the removal of the turbine from service with attendant loss of time for repair or replacement.

In the past, and tending in some instances to avoid the development of weld cracks, it has been common practice to use mechanical joints of various, and often intricate, types to fasten the rotor blades to the rotor wheel or hub. These mechanical fastenings usually are expensive to make, often require intricate machining operations, and in the case of alloys which are not readily machined, forged or formed, the blades and their joints must be precision cast, this within itself being a costly and time-consuming procedure.

There are other occasions where mechanical fastenings, or at least an element thereof, are subjected to welding to the rim of the rotor wheel for assembly and for being secured in place much on the order of an integral welded blade. Under these circumstances many of the blade elements in the prior art have incipient cracks between adjacent faces at the weld and wheel which propagate during use of the rotor.

An outstanding object of my invention accordingly is the provision of turbine rotors having strong, durable and reliable welds of the rotor blades to the rotor wheel, the welds being substantially free of incipient cracks and of crack propagation under the conditions of use.

Referring now more particularly to the practice of my invention, I weld the blades of a turbine rotor, so as to integrate all fayed edges thereof at and adjacent to the weld. Unfused abutting or faying surfaces are propagation centers for cracks between the blades and, accordingly, are undesirable. In one embodiment, and preliminary to the welding operation itself, I provide rotor blades which have a proper shape and satisfactory dimensions at the base, to ensure adequate penetration of the weld metal between fayed edges of the adjacent blades. At times, I adapt the shape of those portions of the wheel at the zone of welding, to facilitate adequate penetration and thorough fusing to the blades. I find, however, that the depth of weld penetration, and consequently the assurance that all fayed edges are fused together by the welding operation varies depending upon such factors as the exact type of welding equipment employed. For example, under a given set of conditions, the penetration achieved is much greater in submerged arc welding operations than it is where manual arc welding is used.

There are many instances where the exact type of welding equipment which I employ, fuses away the abutting or faying surfaces of the blades and wheel to such an extent as to leave the weld metal appreciably free to flow. Under these conditions, I advantageously use an investment material to hold the weld metal within proper limits without appreciable flow which will clog the blades or create incipient cracks. In any event, the thorough elimination which I achieve of fayed edges and sharp notches by welding serves effectively and reliably to prevent crack propagation.

As illustrative of the practice of my invention, I provide a plurality of blades, such as the blades 11 (see Figs. 1 through 4, inclusive) and which for example are all substantially alike and sufficient in number to constitute the blades of a turbine rotor 10. The blades advantageously are made of high-temperature stainless steel, preferably of the chromium-nickel grades disclosed in the copending application, Serial No. 645,015 of William Charles Clarke, Jr., filed February 1, 1946, now Patent 2,447,896, issued August 24, 1948, or in the copending application, Serial No. 705,245 of William Charles Clarke, Jr., filed October 23, 1946, now Patent 2,528,497, issued November 7, 1950.

Each of the blades 11 has a concave-convex bladed portion including a convex blading front surface 11a and a concave back surface 11b in the direction of fluid propulsion of the rotor. These surfaces (see Fig. 3), gradually undergo a transition, respectively curving toward front and back of the blade and merging into the top surface of an enlargement or base 11c, the latter terminating at front and back edges 11d and 11e. Side edges 11f and 11g of the base, and illustratively sitting out from the bladed portion, correspond to the end edges just noted. The lower surfaces of the side edges are bevelled toward the underneath of the base, leaving a flat bottom area 11h of the blade 11; the whole surface then being generally convex. The height of the several edges of the base conveniently is approximately one-half the width of the weld bead which I expect to form in this zone (see Fig. 4).

I dispose the blades around a suitable wheel 12 of the rotor 10, the wheel illustratively being made of the same grade of stainless steel as hereinbefore noted with reference to the blades. As disposed, the bottom areas 11g usually are spaced a slight amount from the circumferential surface or rim 12a of the wheel, and with the front edge 11d of each blade spaced a slight amount from the back edge 11e of the adjacent blade. The outer edges of the wheel illustratively are bevelled so as to form insets 14 and 15 with the bevelled base of the blades 11 for receiving weld metal. To maintain the relative positions of the several rotor components, I often employ a suitable fixture or clamp, not shown, capable of holding or locking the parts in place during the welding operations which I perform.

Before undertaking the welding operation itself, I prefer to introduce an investment 16 of refractory material between and over the rotor blades 11 down to and abutting the top surfaces of the blade bases 11c to prevent the escape of molten metal from the desired zone of welding. Among the refractory investment substances which I utilize are those containing at least one of such compounds as silica, alumina, chromite or magnesia, and a binder such as potassium silicate or sodium silicate. At times, I relay solely on plaster of Paris as the investment material or mix this substance with one or more other refractory materials, as for example of the class already mentioned.

In physical form, the investment illustratively is a packed powder, a paste, mud or slurry, or even a semi-liquid to facilitate placement. Of course, in the case of muds, slurries or other plaster material, final hardening to solid or near-solid condition is advantageous before subjecting the investment to molten weld metal. Further, it is important that the hardened or near-hardened substance be substantially free of moisture in order to prevent absorption of hydrogen at the weld and, also, to prevent possible explosions from the formation of steam under certain conditions of welding. Therefore, where the investment as initially provided in place needs solidification or dehydration, I usually bake the invested rotor in a suitable oven or furnace to achieve this physical condition.

With the investment in place and in proper condition, I subject the rotor wheel and blades to a welding operation which achieves complete fusion of the fayed edges 11d and 11e of the adjacent blades and of the bottoms 11g to the wheel. For this, I prefer to use electric arc welding equipment and a welding electrode capable of giving a deposit having substantially the same composition as the parent metal. By the heat of the electric arc I melt down the electrode and parent metal at the weld during one or more passes along insets 14 and 15, thereby completely fusing the blade bases 11c and the adjacent portion of the wheel 12. I prefer to build up this weld by fusing the metal into two beads, the bead 14' and bead 15', on opposite sides of the rotor, these overlapping inside the weld (see Fig. 4). To facilitate this approach, the top surfaces of the blade bases initially have a mild curvature 11i and 11j substantially the same as will be replaced by the overlapping beads. About one-half the thickness of the beads extends into the wheel portion 12a and the other half into the blade bases.

The investment material meanwhile acts as a dam to prevent escape of the fluid metal beyond the zone of fusion while withstanding the intense heat. All gaps between the blade bases and the wheel, therefore, are eliminated to give a rigid integral joint. When the weld metal sets up, I remove the investment from the rotor.

The investment material or other restraining means which I utilize for preventing escape of the molten metal in fact may be any one of at least two fundamental types, one acting as an insulating dam and the other serving as a heat-conducting dam to cool and freeze the metal before desired limits of flow are exceeded. The cooling type means which I sometimes employ, illustratively takes the form of a plurality of bars made for example of copper or other highly heat-conductive material.

As illustrative of the practice of my invention, inclusive of the use of heat-conducting bars to block the escape of weld metal, I provide a wheel 18 and a plurality of blades 19 for welding the same to produce a turbine rotor 20. On each of both sides, the wheel 18 has a re-entrant chamfered zone 18a extending annularly around the circumference, leaving a narrow peripheral tongue 18b to be the wheel outer edge. The bases of the blades are substantially flared, each having opposite sides which form opposed acute angles with the corresponding bottom area, laterally of the tongue 18b. The angular edges are adjacent to like edges adjacent blades around the wheel periphery, and project over both sides of the tongue 18b, thus defining annular grooves with the chamfered zones 18a for the reception of weld metal.

Between adjacent blades 19, I fix a bar or dam 17, this being in effective position to conduct away the heat of fusion of the weld and to block off escape of weld metal from adjacent top surfaces of the rotor blade bases. For that purpose, the bars have a nosed end 17a next to the top surfaces of the blade bases and abutting the upper end of the space between the blades. Preferably, the noses are sufficiently round to prevent formation of sharp re-entrant recesses in the weld metal.

With the various rotor elements and the bars arranged as described, I lay down a weld bead in the chamfered zones 18a of the wheel and against the bottoms of the blades, for example while using manual arc welding equipment. As the welding progresses the molten metal thoroughly penetrates between the adjacent edges of the blades and is stopped and cooled by the heat-conducting bars 17. A fusion of all fayed edges of the blade bases takes place. The underneath surface of the blade bases becomes integral with the deposited weld beads and fused to the tongue 18b. A fully welded joint between the blade bases and the wheel accordingly is achieved free of incipient cracks.

Usually when the outermost ends of the rotor blades present fayed edges one to another, such as the edges 19c and 19d (see Figs. 5 and 6), I also thoroughly fuse these to eliminate sharp notches and incipient cracks. In this, I frequently use investment material or a bar for blocking free flow of metal of the weld and to give a surface devoid of fayed edges. Sometimes, I use the same investment material or bars to back up the spaces at both ends of the blades.

Thus it will be seen that in this invention there are provided a method and welded product in which the various objects hereinbefore set forth together with many thoroughly practical advantages are successfully achieved. It will be seen that the method of welding is simple and effective as is conducive to the provision of crack-resistant welds. It will also be noted that the resulting turbine rotors are durable and reliable, free of cracking at critical points of stress, and are safe to use all with minimum shut down for repair.

While particular illustration is given of the turbine rotors, it will be understood that many of the advantages of my invention are had in turbine stators and in turbine nozzle boxes as well. It will be understood, therefore, that I intend to include as part of my invention turbine stators, turbine nozzle boxes and like turbine elements fabricated in accordance with the foregoing method.

As many possible embodiments may be made of my invention, and as many changes may be made in the embodiments hereinbefore set forth, it will be understood that all matter described herein is to be interpreted as illustrative and not as a limitation.

I claim as my invention:

1. In a method of welding turbine elements so as to avert incipient cracking between the same, the art which includes providing a support for turbine blades, disposing along said support to the approximate relative positions desired a plurality of blades having base portions of such size as to be consumed in welding and having a generally convex bottom surface and having profile curved surfaces defining the transition from main blade portion to base portion and providing a rounded surface extending from the back of one blade to the face of the adjacent blade, blocking off the outermost limits of fayed edges of said blades themselves in the desired zones of welding, and forming welded joints between the blades themselves and between blades and support by fusing the generally convex bottom surfaces of the blade bases while depositing weld metal to fill the spaces between adjacent blade bases and between the bottom surfaces of the blade bases and the support so as to fuse together and eliminate the fayed edges, the profile of the well being such as to match that of the blades.

2. In a method of welding turbine rotors so as to avoid cracking between blades and wheel portions, the art which includes providing a wheel portion of the rotor and a plurality of rotor blades each having a short base portion with generally convex bottom surface and a main portion with profile curved surfaces defining the transition between the back of one to the front of the adjacent blade and giving a rounded surface junction between blades, said rotor blades being disposed to the approximate relative positions desired in the rotor, introducing a refractory investment against the outermost limits of fayed edges adjacent blades in the desired zone of welding, and forming a welded joint between the several blades and wheel by fusing the generally convex bottom surfaces of the blade bases while depositing weld metal to fill the spaces between adjacent blade bases and between the bottom surfaces of the blade bases and the wheel so as to fuse together the bases of said rotor blades and eliminate the fayed edges.

3. In a method of welding turbine rotors so as to avoid cracking between blades and wheel portion, the art which includes providing a wheel portion of the rotor and a plurality of rotor blades disposed to the approximate relative positions desired in the rotor, each said blade having a short base portion having a generally convex bottom surface and a main portion with profile curved surfaces defining the transition between the two and providing a rounded surface junction between the front of one blade and the back of the adjacent blade, introducing heat-conducting bar means firmly between blades and against the outermost limits of the fayed edges in the desired zone of welding, and forming a welded joint between the several rotor portions by fusing the generally convex bottom surfaces of the blade bases while depositing weld metal to fill the spaces between adjacent blade bases and between the bottom surfaces of the blade bases and the wheel so as to fuse together the base of said rotor blades and eliminate the fayed edges.

GEORGE EDWIN LINNERT.

References Cited in the file of this patent

UNITED STATES PATENTS

| Number | Name | Date |
|---|---|---|
| 1,902,051 | Wall | Mar. 21, 1933 |
| 1,990,077 | Kershaw | Feb. 5, 1935 |
| 2,174,380 | Doran | Sept. 26, 1939 |
| 2,352,716 | Jones | July 4, 1944 |
| 2,380,276 | Warren | July 10, 1945 |
| 2,392,281 | Allen | Jan. 1, 1946 |
| 2,454,580 | Thielemann | Nov. 23, 1948 |

FOREIGN PATENTS

| Number | Country | Date |
|---|---|---|
| 580,036 | Great Britain | Aug. 23, 1946 |